No. 626,869. Patented June 13, 1899.
T. SANDS.
ICE CREAM FREEZER.
(Application filed Jan. 3, 1898. Renewed May 9, 1899.)
(No Model.) 2 Sheets—Sheet 1.

WITNESSES
INVENTOR
Thomas Sands

No. 626,869. Patented June 13, 1899.
T. SANDS.
ICE CREAM FREEZER.
(Application filed Jan. 3, 1898. Renewed May 9, 1899.)
(No Model.) 2 Sheets—Sheet 2.
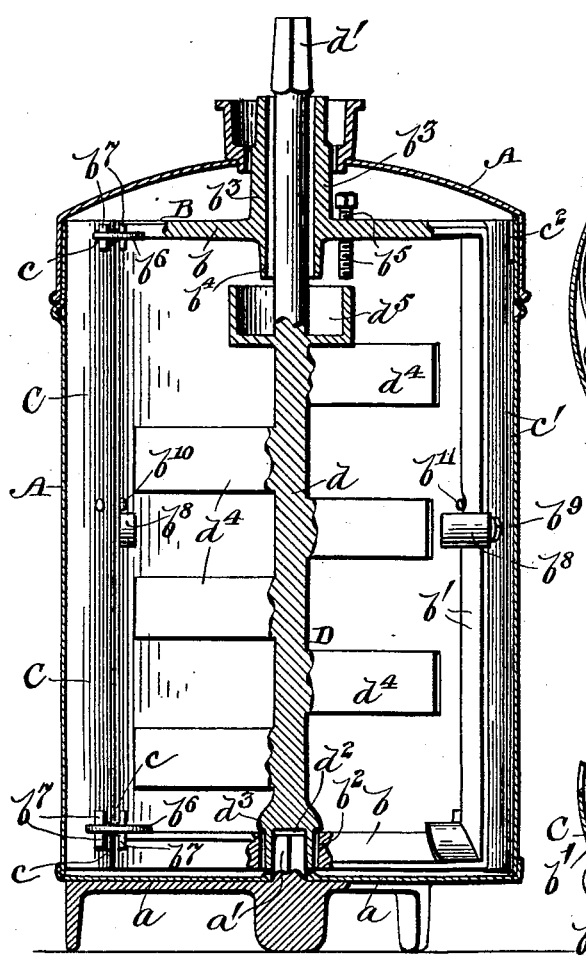

UNITED STATES PATENT OFFICE.

THOMAS SANDS, OF NASHUA, NEW HAMPSHIRE.

ICE-CREAM FREEZER.

SPECIFICATION forming part of Letters Patent No. 626,869, dated June 13, 1899.

Application filed January 3, 1898. Renewed May 9, 1899. Serial No. 716,177. (No model.)

*To all whom it may concern:*

Be it known that I, THOMAS SANDS, a citizen of the United States, residing at Nashua, in the county of Hillsborough and State of New Hampshire, have invented certain new and useful Improvements in Ice-Cream Freezers; and I do hereby declare the following to be a full, clear, and exact description of the invention, such as will enable others skilled in the art to which it appertains to make and use the same.

My invention relates to ice-cream freezers; and it consists of certain novel constructions, combinations, and arrangements of parts, as will be hereinafter fully described and specifically claimed.

Figure 1:
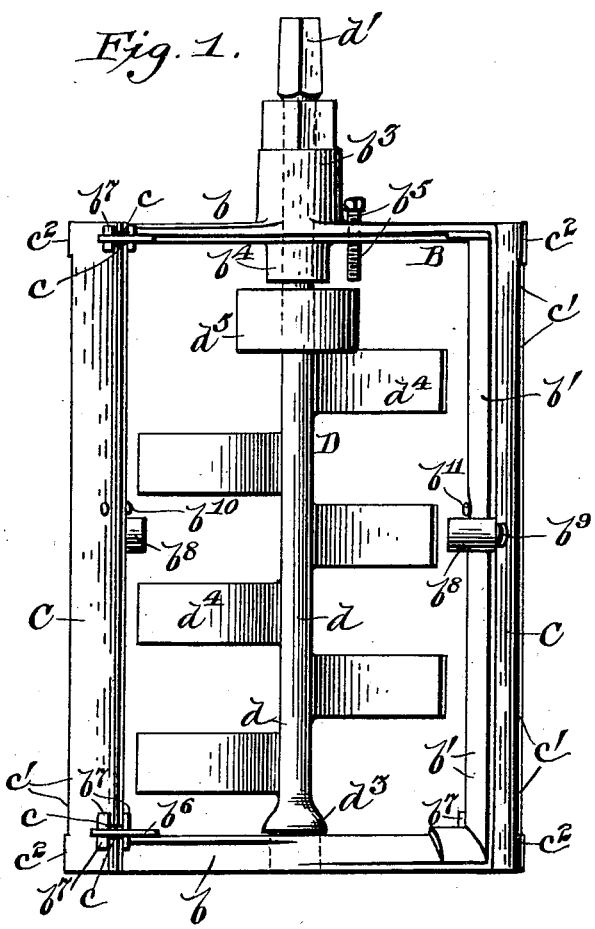
Figure 3:
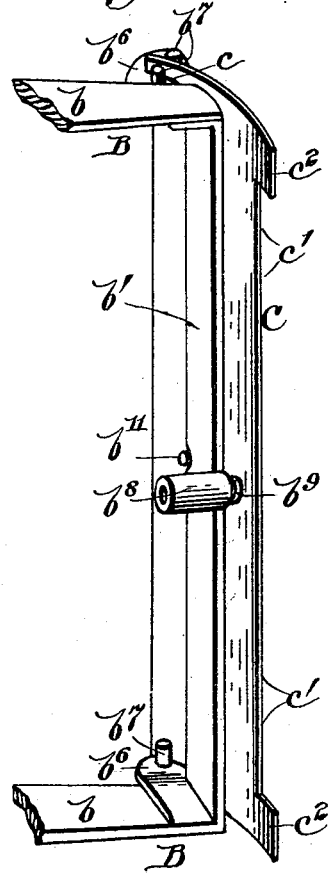
Figure 4:
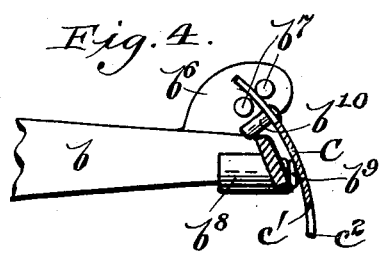

In the accompanying drawings, Figure 1 is a side elevation of the inner and outer beaters and the scrapers. Fig. 2 is a vertical section through the same and the freezing-can, the cover being on the can. Fig. 3 is a detail perspective view looking from the inside of one of the scrapers, showing the same connected to a portion of the outer beater. Fig. 4 is a horizontal section through a portion of the outer beater and through one of the scrapers on the line of the connection for securing the scraper to the beater. Fig. 5 is a top plan view of the inner and outer beaters and the scrapers, and Fig. 6 is a horizontal section through the inner and outer beaters on the line of the springs which bear against the scrapers.

A in the drawings represents the freezing-can; B, the outer beater or frame; C C, scrapers, and D the inner beater.

The freezing-can may be of any desired size and is provided on its inside in the center of its bottom $a$ with a square stud $a'$, which is secured in position in any suitable manner and is designed to be inserted into a socket formed in the lower end of the inner beater D. In ordinary constructions the stud or projection is formed on the inner beater and the socket is generally formed in the bottom of the can. By my construction and arrangement sugar and other material which are placed in the freezer are prevented from collecting in the socket, which would not be the case if the socket were formed in the bottom of the freezing-can.

The outer beater consists of an open frame practically rectangular in form and comprises upper and lower horizontal blades $b$ $b$ and vertical connecting-blades $b'$ $b'$. The upper and lower blades may be bent into any suitable shape to facilitate the beating action. The beater-frame is formed on its lower blade with a vertical passage $b^2$ for the passage of the stud $a'$ on the freezing-can and also for the reception of the lower journal end of the inner beater D. The upper blade is formed with a hub $b^3$, through which the shaft of the inner beater passes, the hub being contracted at its lower end, as at $b^4$, and extended down below the upper horizontal blade of the outer beater, as shown and for a purpose as will be hereinafter described. The upper horizontal blade of the beater is also provided with a downwardly-extending screw $b^5$, which is adapted to engage the upper edge of an oil-receiving cup, if the inner beater attempts to rise, provided on the vertical shaft of the inner beater, which prevents the accidental displacement and disengagement of the inner beater from the outer beater, as will be hereinafter more fully set forth. When it is desired to disengage the inner beater from the outer beater for any purpose, it can be readily accomplished by raising the screw and pushing the shaft up until the lower end is freed from the lower blade of the outer beater, when the shaft carrying its beaters can be drawn out. The outer beater is formed on its upper and lower corners with oppositely and laterally extending projections or plates $b^6$ for receiving the scrapers C, as will be hereinafter described.

The scrapers C C are curved in cross-section and are secured at an angle at their upper and lower ends to the projections $b^6$. This is accomplished by forming the said beaters near their upper and lower ends with short transverse slots $c$, into which the projections $b^6$ are slipped, and pins $b^7$ are passed through the projections on either side of the scraper and are placed at a sufficient distance apart to limit the lateral movement of the scraper. The scrapers are prevented from becoming disengaged from the projections $b^6$ by means of pins $b^{10}$ $b^{11}$, which are passed horizontally through the scrapers and bear against the vertical bars of the outer beater on opposite sides. The scrapers are also cut away, as at $c'$, on one of their edges, which leave projecting ends $c^2 c^2$ at the top and bottom of the scraper, so that when the outside beater is revolved the scrapers will not bear upon the inside of the can their entire length. To hold the scrapers normally outward, hollow lugs $b^8$ are formed on the outer beater in the rear of the scrapers and preferably about midway the height of the outer beater, in which hollow lugs coil-springs $b^9$ are secured, which bear with their outer ends upon the back of the outer scrapers and force the same normally out against the inside of the freezing-can. By this construction and arrangement the scrapers will be held in close proximity to the inside of the can and will prevent any large amount of frozen cream accumulating on the sides thereof, and the scraper will conform to any irregularity in the can.

The inner beater D comprises a vertically-arranged shaft $d$, having a squared upper end $d'$ and a lower squared socket $d^2$ and a boss or projection $d^3$, which latter rests upon the lower blade of the outer beater and prevents too much play or movement between the parts. The shaft $d$ is provided with laterally-extending wings or blades $d^4$, which are arranged in alternate manner and are preferably curved. Above the upper blade of the inner beater and just below the contracted portion $b^4$ of the hub $b^3$ the shaft is formed with an oil-collecting cup $d^5$. The advantage of this construction is that any surplus of oil which runs off from the operating gearing will pass down the shaft $d$ and be prevented from entering the cream by being caught in the oil-collecting cup. The contracted portion $b^4$ of the hub $b^3$ conducts and guides the oil to the oil-cup, and the downwardly-extending screw $b^5$ prevents too much movement between the parts and also prevents the separation of the inner beater from the outer beater.

By constructing the scrapers with cut-away portions and projecting ends to hold the scrapers at a given distance from the inside of the can the edges are permitted to run quite close to the side of the can without coming in contact with the same throughout their entire length, which is important, as it reduces the friction to a minimum, and I have found from practical tests that ice does not form where the scrapers run so close. The scrapers strike the ice as it begins to form, and it has not body enough to resist or stand up against the scrapers.

I have not shown or described the construction of the gearing for operating the inner and outer beaters, as they form no part of my invention and are familiar to those skilled in the art.

My invention is adapted for freezers of any size, whether operated by hand or power, and any number of springs may be employed for forcing the scrapers outward, and the inner beater-frame might be constructed to carry four scrapers instead of two without departing from the spirit of my invention.

Instead of employing the adjustable screw $b^5$ a lug might be employed, which was constructed of bendable material, so that it could be bent up when the inner beater is being inserted and turned down again after it has been inserted, and thus hold the beater in position and from becoming disengaged from the outer beater.

Having now described my invention, what I claim as new, and desire to secure by Letters Patent, is—

1. In an ice-cream freezer, a beater comprising in its construction an approximately rectangular open frame, horizontally-extending projections provided on the said beater at top and bottom and at opposite sides, and scrapers provided with transverse slots which receive the projections, stop-pins passed vertically through the projections on both sides of the scrapers for limiting the lateral movement of the scrapers and pins passed horizontally through the scrapers which engage the sides of the vertical bars of the outer beater for preventing the disengagement of the scrapers from the outer beater, substantially as described.

2. In an ice-cream freezer, a beater comprising in its construction an approximately rectangular open frame, horizontally-extending projections provided on the said beater at top and bottom thereof and at opposite sides, and spring-pressed scrapers provided with transverse slots which receive the projections, stop-pins passed vertically through the projections on both sides of the scrapers for limiting the lateral movement of the scrapers and pins passed horizontally through the scrapers which engage the sides of the vertical bars of the outer beater for preventing the disengagement of the scrapers from the outer beater, and springs connected to the beater and bearing upon the rear side of the scrapers to force them normally outward, substantially as described.

3. In an ice-cream freezer, an outer beater comprising in its construction an approximately rectangular open frame, having an upper hub portion, scrapers attached to the said outer beater and an inner beater journaled in the outer beater and extending through the hub of the outer beater and comprising a vertical shaft having laterally-extending blades and provided with an oil-receiving cup in line with and below the hub on the outer beater, substantially as described.

4. In an ice-cream freezer, an outer beater comprising an approximately rectangular open frame having an upper hub portion which is contracted at its lower end and also provided with a screw which extends downwardly from the outer beater, scrapers attached to the said outer beater and an inner beater journaled in the outer beater and extending through the hub of the outer beater and comprising a vertical shaft having laterally-extending blades and provided with an oil-cup in line with and below the said screw of the outer beater for preventing the accidental rising of the said inner beater, substantially as described.

5. In an ice-cream freezer, an outer beater comprising in its construction an approximately rectangular open frame, having an upper hub portion which is contracted at its lower end and also provided with a screw which extends downwardly from the outer beater, horizontally-extending projections provided on the said outer beater at top and bottom thereof and at opposite sides, spring-pressed scrapers provided with transverse slots which receive the projections, stop-pins passed vertically through the projections on both sides of the scrapers for limiting the movement of the scrapers and pins passed horizontally through the scrapers which engage the sides of the vertical bars of the outer beater for preventing the disengagement of the scrapers from the outer beater, and an inner beater journaled in the outer beater and extending through the hub of the outer beater and comprising a vertical shaft having laterally-extending blades provided with an oil-cup in line with and below the screw of the outer beater whereby the inner beater is prevented from rising, substantially as described.

6. In an ice-cream freezer, a beater comprising in its construction an approximately rectangular open frame, horizontally-extending projections provided on the said beater at top and bottom, and at opposite sides, and scrapers adapted to conform as to their scraping edges to any irregularity in the inner surface of the can, said scrapers having parts adapted to hold the cutting edge at a given distance from the can by bearing on the same, and secured by being connected to the outer edge of said outer rectangular beater, and held in contact with the can by a spring action, substantially as described.

7. In an ice-cream freezer, a beater comprising in its construction an approximately rectangular open frame, horizontally-extending projections provided on the said beater at top and bottom, and at opposite sides, and scrapers adapted to conform as to their scraping edges to any irregularity in the inner surface of the can, said scrapers having parts adapted to hold the cutting edge at a given distance from the can by bearing on the same, and secured by being connected to the outer edge of said outer rectangular beater, and provided with stops which prevent the scraper from extending beyond a fixed line, the scrapers being held in contact with the can by a spring action, substantially as described.

8. In an ice-cream freezer, an outer beater and an inner beater, and a screw passed through the outer beater and adapted to prevent the accidental disengagement of the inner beater, but which can be readily adjusted to permit of the removal of the inner beater, substantially as described.

9. In an ice-cream freezer, an outer beater and an inner beater, the inner beater being provided with an oil-receiving cup, and means provided on the outer beater which is adapted to engage the oil-cup and prevent the accidental disengagement of the inner beater, substantially as described.

10. In an ice-cream freezer, the combination with a can, of a beater, scrapers carried by said beater said scrapers being cut away vertically except at their upper and lower edges, whereby the cut-away portions are free from contact with the sides of the can while being operated, substantially as described.

11. In an ice-cream freezer, the combination with a can, of a beater, scrapers carried by said beater, projections upon said scrapers for holding their cutting edges out of engagement with the sides of the can, substantially as described.

In testimony whereof I affix my signature in presence of two witnesses.

THOMAS SANDS.

Witnesses:
R. T. SMITH,
L. A. SMITH.